US005397669A

United States Patent [19]

Rao

[11] Patent Number: 5,397,669

[45] Date of Patent: Mar. 14, 1995

[54] LIQUID TONERS FOR USE WITH PERFLUORINATED SOLVENTS

[75] Inventor: Prabhakara S. Rao, Vadnais Heights

[73] Assignee: Minnesota Mining and Manufacturing Company, St. Paul, Minn.

[21] Appl. No.: 185,198

[22] Filed: Jan. 24, 1994

Related U.S. Application Data

[62] Division of Ser. No. 946,593, Sep. 18, 1992, Pat. No. 5,283,148.

[51] Int. Cl.⁶ ........................ G03G 9/087; G03G 9/13; C08F 16/00; C08K 5/02

[52] U.S. Cl. .................................... 430/108; 430/114; 430/116; 523/205; 524/462; 524/463; 526/242; 526/250

[58] Field of Search ..................... 524/462, 463, , 805; 523/205; 525/326.2; 526/242, 245, 247, 248, 250, 934; 430/108, 114, 116

[56] References Cited

U.S. PATENT DOCUMENTS

| | | | |
|---|---|---|---|
| 4,144,184 | 3/1979 | Takahata et al. | 430/115 |
| 4,564,574 | 1/1986 | Uytterhoeven et al. | 430/115 |
| 4,668,749 | 5/1987 | Graun et al. | 526/245 |
| 4,758,492 | 7/1988 | Nair | 430/114 |
| 4,853,448 | 8/1989 | Müller et al. | 526/242 |
| 4,900,569 | 2/1990 | Le | 526/245 |
| 4,978,598 | 12/1990 | Elmasry et al. | 430/137 |
| 4,983,488 | 1/1991 | Tan et al. | 524/805 |
| 4,988,602 | 1/1991 | Jongewaard et al. | 430/115 |
| 5,026,621 | 6/1991 | Tsubuko et al. | 525/276 |
| 5,061,591 | 10/1991 | Nakanishi et al. | 430/159 |
| 5,093,398 | 3/1992 | Röttger et al. | 526/245 |

FOREIGN PATENT DOCUMENTS

| | | |
|---|---|---|
| 0334643 | 9/1989 | European Pat. Off. . |
| 0437073A2 | 7/1991 | European Pat. Off. . |
| 2121057 | 8/1972 | France . |
| 3039224A1 | 4/1981 | Germany . |
| 1-237559 | 9/1989 | Japan . |

*Primary Examiner*—Tae H. Yoon

*Attorney, Agent, or Firm*—Gary L. Griswold; Walter N. Kirn; Mark A. Litman

[57] ABSTRACT

An electrostatic liquid toner imaging process uses a liquid toner comprises a perfluorinated solvent and polymer resin-bound pigment particles. The polymer resin is preferably a resin containing highly fluorinated or perfluorinated units within the polymer resin or a resin comprising of at least 10% perfluorinated units, the rest comprising nonfluorinated units.

14 Claims, No Drawings

LIQUID TONERS FOR USE WITH PERFLUORINATED SOLVENTS

This is a division of application No. 07/946,593, filed Sep. 18, 1992, now U.S. Pat. No. 5,283,148.

FIELD OF THE INVENTION

This invention relates to liquid toners that are useful for electrographic and electrophotographic processes.

BACKGROUND OF THE INVENTION

Electrophotographic systems (that is, systems in which a toner is deposited on a charged surface and subsequently transferred to a receiving sheet) employing liquid toners are well known in the imaging art, see for example Schmidt, S. P.; Larson, J. R.; Bhattacharya, R. in *Handbook of Imaging Materials,* Diamond, A. S., Ed.: Marcel Dekker, New York, 1991, pp 227–252 or Lehmbeck, D. R. in *Neblette's Handbook of Photography and Reprography,* Sturge, J., Ed.: Van Nostrand Reinhold, New York, 1977, Chapter 13, pp 331–387.

In most instances, the preferred solvent has been a high boiling hydrocarbon (for example, Isopar TM solvents, boiling range: 130°–160° C.) that has both a low dielectric constant and a high vapor pressure necessary for rapid evaporation of solvent following deposition of the toner onto a photoconductor drum, transfer belt, and/or receptor sheet. Rapid evaporation is particularly important for cases in which multiple colors are sequentially deposited and/or transferred to form a single image.

There are significant drawbacks to the use of hydrocarbon solvents with respect to adequate evaporation rates for high speed imaging applications, regarding low flash points (hydrocarbon solvents with boiling points less than 120° C. typically have flash points below 40° C.), environmental pollution, and toxicity. Similarly, chlorine containing solvents are undesirable from the standpoint of atmospheric pollution. It would be advantageous to employ a class of solvents with a higher evaporation rate than that of ordinary hydrocarbon solvents, lessened pollution concerns, non-flammability, and lower toxicity.

One class of solvents that can solve some of these problems consists of the perfluorinated (or highly fluorinated) solvents such as the Fluorinert TM solvents (3M Company), hexafluorobenzene and so on. While these solvents have many desirable physical properties that make them suitable as candidates in electrophotographic applications employing liquid toner dispersions, they are well known for their inability to dissolve or disperse most materials. Thus, in order to develop an electrophotographic process employing fluorinated solvents it is necessary to develop stable dispersions of pigment, polymer, and charging agents. This would have to be accomplished by preparation of organosol polymers that are capable of dispersing pigment in those solvents or to prepare latex emulsions of polymers that can disperse pigments, or by adsorbing highly fluorinated polymers onto pigments in fluorocarbon solvents.

Chlorofluorocarbons (e.g., Freon TM -113) have been employed in solvents for electrophotographic liquid toner dispersions as described in Soviet Pat. No. 1,305,623.

Electrophotographic toners having perfluoroethylene as solvent have been described, but not actually used, in Japanese Kokai Nos. 59-114,549 and 59-114,550. However, perfluoroethylene is a gas at room temperature and wholly unsuitable as a solvent for electrophotography.

U.S. Pat. No. 5,026,621 discloses a toner for electrophotography comprising a color component and a fluoroalkyl acrylate block copolymer.

Liquid toners based on highly fluorinated solvents according to the present invention produce very quickly drying images (<3 seconds) on the dielectric medium, so that succesive imaging 3 and 4 colors can be performed at a rate of up to 3 pages of 4-color copy per minute on plain paper. The currently used developmental toners produced images that do not dry at a rate fast enough to produce the hard copy output at the required rate.

A general discussion of color electrophotography is presented in "Electrophotography," by R. M. Schaffert, Focal Press, London & New York, 1975, pp 178–190.

SUMMARY OF THE INVENTION

This invention relates to a method of forming an image comprising the steps of:

a) providing a dielectric medium having at least one region of electrostatic charge (e.g., an imagewise distribution of charge),
b) intimately contacting the dielectric medium with a liquid toner comprising a perfluorinated solvent (which is a liquid at room temperature) and polymer resin bound pigment particles, thereby depositing said toner in a pattern corresponding to the surface charge on the dielectric medium, and
c) optionally transferring the deposited polymer resin bound pigment particles to a receptor.

In another aspect, this invention relates to polymer resin bound pigment particles, and latices derived therefrom, comprising pigment particles in intimate association with a polymeric resin, wherein the polymeric resin is a copolymer of 65 to 89.5 weight percent of a non-fluorinated free-radically polymerizable monomer, 10 to 20 weight percent highly fluorinated macromer terminated at exactly (only) one end with a free-radically polymerizable group, and from 0.5 to 15 weight percent of a free-radically polymerizable monomer having a group for binding (complexing) a polyvalent metal ion.

In yet another aspect, this invention relates to polymer resin bound pigment particles, and latices derived therefrom, comprising pigment particles in intimate association with a polymeric resin, wherein the polymeric resin is a copolymer of from 74.5 to 97.5 weight percent or from 75 weight percent to 98 percent of a highly fluorinated free-radically polymerizable monomer, and from 2 to 25 weight percent free-radically polymerizable non-fluorinated monomers, wherein at least 0.5 weight percent of the free-radically polymerizable non-fluorinated monomers has a group for binding a polyvalent metal ion.

Another aspect of the present invention is a process for forming an emulsion of a hydrocarbon polymer stabilized by a fluorocarbon shell in a highly fluorinated solvent, said process comprising the steps of:

1) combining at least one free radically polymerizable monomer in a highly fluorinated solvent, with a macromer soluble in said highly fluorinated solvent, and a second monomer capable of free radical polymerization and having at least one group thereon which can sequester a metal cation, 2) emulsifying said monomers in said highly fluorinated solvent, and 3) free radically polymerizing said monomers in the presence of a metal cation charging agent.

In another aspect, this invention provides polymer resin latices in perfluorinated solvents.

In still another aspect, this invention relates to polymer resin bound pigment particles comprising pigment particles in intimate association with a polymeric resin, wherein the polymeric resin is a homopolymer or copolymer of one or more highly fluorinated free-radically polymerizable monomers.

In other aspects, the invention relates to liquid toners comprising polymer resin bound pigment particles of the present invention that have been electrostatically charged by admixture with a soluble salt of a polyvalent metal ion and dispersed in a perfluorinated solvent The process and materials of the present invention provide improved means for rapid generation of high quality electrophotographic and electrographic images.

A method of synthesis of a perfluorinated polyacrylate stabilizer is also described in this invention.

The prefix "perfluoro" and the term "perfluorinated" as used herein, except where otherwise noted, means that all hydrogen atoms within the molecule or group defined as perfluorinated have been replaced with fluorine atoms.

DETAILED DESCRIPTION OF THE INVENTION

Electrophotographic and electrographic processes involve forming an electrostatic image on the surface of a dielectric medium. The dielectric medium may be an intermediate transfer drum or belt or the substrate for the final toned image itself as described by Schmidt, S. P. and Larson, J. R. in *Handbook of Imaging Materials* Diamond, A. S., Ed: Marcel Dekker: New York; Chapter 6, pp 227-252, and U. S. Pat. Nos. 4,728,983, 4,321,404, and 4,268,598.

In electrophotography, the electrostatic image is typically formed on a drum coated with a dielectric medium, by uniformly charging the dielectric medium with an applied voltage, discharging the electrostatic image in selected areas by exposing those regions to be discharged to light, applying a toner to the electrostatic medium having the charge image, and transferring the toned image through one or more steps to a receptor sheet where the toned image is fixed.

In electrography, the charge image is placed onto the dielectric medium (typically the receiving substrate) by selective charge of the medium with an electrostatic writing stylus or its equivalent. Toner is applied to the electrostatic image and fixed.

While the electrostatic charge of either the toner particles or dielectric medium may be either positive or negative, electrophotography as employed in the present invention normally is carried out by dissipating charge on a positively charged dielectric medium. Toner is then transferred to the regions in which positive charge was dissipated.

Due to the similarity of the two processes, toners useful in electrophotography are generally useful in electrography as well. Both dry and liquid toners may be used to supply the pigment necessary to form the colored image. Liquid toners typically provide better resolution in electrophotographic and electrographic imaging applications than dry toners, but have problems related to difficulties in handling solvents.

Liquid toners are dispersions of polymer resin bound pigment particles in a dispersing solvent. They are stabilized from flocculation by electrostatic charges that may be either positive or negative (i.e., electrostatic stabilizers), and are optionally also stabilized by long chain solvated polymer segments (i.e., steric). These long chain solvated segments prevent insoluble portions of the polymer resin bound pigment particles from agglomerating by providing a soluble shell surrounding the insoluble portions. According to the present invention there are three types of liquid toners that may be employed in the practice of the method of the present invention whereby a perfluorinated dispersing solvent is used.

In a first preferred embodiment, the polymer resin bound pigment particles comprise pigment particles in intimate association with a polymeric resin, wherein the polymeric resin is a copolymer of 65 to 89.5 weight percent of a non-fluorinated free-radically polymerizable monomer, 10 to 20 weight percent of a highly fluorinated macromer terminated at only one end with a free-radically polymerizable group, and from 0.5 to 15 weight percent, preferably 0.5 to 12 weight percent, and most preferably 0.5 to 10 weight percent of a free-radically polymerizable non-fluorinated monomer having a group for binding a polyvalent metal ion. The polymer resin bound pigment particles of this embodiment form latices in perfluorinated solvents.

Suitable highly fluorinated macromers include any highly fluorinated macromer having a molecular weight in the range of about 10,000 grams/mole to 250,000 grams/mole and a fluorine content of from about 40 to 95 percent by weight. Non-limiting examples include polymers of perfluorinated epoxides such as tetrafluoroethylene oxide, hexafluoropropylene oxide, etc.; fluorinated alkenes such as pentafluorostyrene, octafluorostyrene, perfluoro-1,4-pentadiene, perfluoro-1,6-heptadiene, 3,5-bis(trifluoromethyl) styrenes, etc.; fluorinated acrylates and methacrylates such as 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluorodecyl acrylate, 2,2,3,3,4,4,5,5,6,6,7,7,8,8,9,9,10,10,10-nonadecafluorodecyl methacrylate, 1,2,2,3,3,4,4,5,5,6,6-undecafluorocyclohexylmethyl acrylate, 1,2,2,3,3,4,4,5,5,6,6-undecafluorocyclohexylmethyl acrylate, 1,2,2,3,3,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroethyl methacrylate, 1,1,1,3,3,3-hexafluoro-2-propyl acrylate; $C_8F_{17}SO_2N(n\text{-}C_4H_9)CH_2CH_{20}O_2CCH{=}CH_2$ (FOSEA, 3M Company), etc.; trifluorinated alkyl acrylonitriles, e.g., trifluoromethyl acrylonitrile; perfluoroalkyl vinyl ethers such as perfluorobutyl vinyl ether, pentafluoroethyl vinyl ether; etc.; or any other highly fluorinated monomers. Highly fluorinated monomers may be prepared and polymerized by known methods such as those described by Ito et al. in *Macromolecules* 1982, 15, 915-20 and *Macromolecules* 1984, 17, 2204-5, including bulk, emulsion, or dispersion free radical polymerization, bulk anionic polymerization. Many fluorinated monomers suitable for preparing macromers used in practice of the present invention are commercially available from 3M Company (St. Paul, Minn.) or E. I. DuPont de Nemours (Wilmington, Del.).

Suitable non-fluorinated free-radically polymerizable monomers include, but are not limited to, vinyl ethers such as butyl vinyl ether, ethyl vinyl ether, phenyl vinyl ether, etc.; vinyl esters such as vinyl acetate, vinyl propionate, vinyl butyrate, etc.; chlorinated vinyl alkenes such as vinylidene chloride and vinyl chloride; styrenes such as 4-methylstyrene, styrene, α-methylstyrene, etc.; acrylate and methacrylate esters such as isobornyl acrylate, isobornyl methacrylate, decyl acrylate, butyl methacrylate, lauryl methacrylate, etc.; acrylonitrile; vinylazlactones; vinylpyridines; N-vinylpyrrolidones; acrylic and methacrylic acids, silanes such as tris(trimethylsiloxy)-3-methacryloxypropylsilane, trimethylsilyl methacrylate and the like. These monomers are commercially available from standard vendors or may be prepared according to readily available literature methods. In addition monomers that form copolymers such as maleic anhydride may be successfully employed.

Suitable free-radically polymerizable monomers having a group for binding a polyvalent metal ion are well known in the electrophotographic art and include for example those monomers having (acetoacetoxy groups such as acetoacetoxyethyl methacrylate) acetoacetoxy groups, though well-known as complexing agents, may not be common and well-known in toner area or 8-hydroxyquinoline groups such as 8-hydroxyquinolin-5-ylmethyl acrylate, bypyridyl such as groups 2,2'-bypyrid-4-ylmethyl acrylate, and so on. They may be purchased commercially or prepared by standard methods.

In a second preferred embodiment, the polymer resin bound pigment particle comprises a pigment in intimate association with a polymeric resin, wherein the polymeric resin is a copolymer of 75 to 98 weight percent of a highly fluorinated free-radically polymerizable monomer, having from 2 to 25 weight percent of a free-radically polymerizable non-fluorinated monomer, wherein at least 0.5 weight percent, preferably 0.5 to 15 weight percent, of the free-radically polymerizable non-fluorinated monomers have a group for binding a polyvalent metal ion.

Non-limiting examples of suitable highly fluorinated free-radically polymerizable monomers are acrylates prepared from fluorinated alcohols and acryloyl chloride such as 2,2,3,3,4,4,5,5,6,6,7,7,8,8,8-pentadecafluorooctyl acrylate, 2,2,3,3,4,4,5,5,6,6,7,7,8,8,8-pentadecafluorooctyl methacrylate, 2,2,3,3,4,4,5,5,6,6,7,7,8,8,9,9,10,10,10-nonadecafluorodecyl acrylate, 2,2,3,3,4,4,5,5,6,6,7,7,8,8,9,9,10,10,10-nonadecafluorodecyl methacrylate, 1,2,2,3,3,4,4,5,5,6,6-undecafluorocyclohexylmethyl acrylate, 1,2,2,3,3,4,4,5,5,6,6-undecafluorocyclohexylmethyl acrylate, 1,2,2,3,3,4,5,5,6,6-decafluoro-4-trifluoromethylcyclohexylmethyl acrylate, perfluorohexyl acrylate, perfluorobutyl acrylate, perfluorodecyl acrylate, 2,2,2-trifluoroethyl acrylate, 2,2,2-trifluoroethyl methacrylate, 1,1,1,3,3,3-hexafluoro-2 -propyl acrylate; $C_8F_{17}SO_2N(n\text{-}C_4H_9)CH_2CH_2O_2CCH{=}CH_2$ (FOSEA TM, 3M Company), etc. and are commercially available or may be made according to standard esterification methods.

In the first and second embodiments the polymer resin is prepared and forms a latex in perfluorinated solvents. The pigment is then added to the latex to form a dispersion.

In the third embodiment, the polymer resin bound pigment particle comprises a pigment in intimate association with (e.g., adsorbed to) a polymeric resin, wherein the polymeric resin is a homopolymer or copolymer of one or more highly fluorinated free-radically polymerizable monomers. No polyvalent metal ion binding group is present. The polymer resin bound pigment particles are charged by polyvalent metal ion adsorption onto the surface of the polymer resin bound pigment particles.

Pigments suitable for use in the present invention include pigments known for use in electrophotography, not limited to phthalocyanines such as copper phthalocyanine; carbon black; nigrosine dye; Aniline Blue; Calconyl Blue; Chrome Yellow; DuPont Oil Red (DuPont); Monoline Yellow; Sunfast Blue, Sun Yellow, Sun Red and other pigments available from Sun Chemical; Harmon Quindo red; Regal 300; Fluorol Yellow 088, Fluorol Green Gold 084, Lumogen Yellow S 0790, Ultramarine Blue, Ultramarine Violet, Ferric Ferrocyanide, and other pigments available from BASF; Malachite Green Oxalate; lamp black; Rose Bengal; Monastral Red; magnetic pigments such as magnetite, ferrites such as barium ferrite and manganese ferrite, hematite, etc.

The liquid toner dispersions of the present invention are prepared by high shear mixing of the polymer resin, pigment materials, and a polyvalent metal ion salt in an appropriate solvent (i.e., carrier liquid, e.g., fluorinated organic carrier liquid such as highly fluorinated [>60% by weight fluorine] hydrocarbon [including those with ether linkages] carrier liquids).

Solvents or carrier liquids that may be used for liquid toner dispersions of the present invention should have a boiling point greater than about 90° C. and less than about 140° C., and include perfluorinated alkanes, alkanes, ethers, arenes, alkarenes, aralkanes, alkenes, and alkynes. The solvents may contain rings. Non-limiting examples of perfluoroalkanes include perfluoroheptane, mixtures of perfluorinated 2-butyltetrahydrofuran and mixtures of it with perfluorooctane, perfluorohexane, perfluorotributylamine, perfluorotriamylamine, Fluorinert TM solvents available from 3M Company such as Fluorinert TM solvents FC-84, FC-77, FC-104, FC-75, FC-40, FC-43, FC-70, FC-71, etc. Recognizing that many perfluorinated materials have residual amounts of hydrogen atoms that were not replaced by fluorine, it is anticipated that hydrogen atoms in the solvent are not deleterious provided that the total fluorine content is greater than about 60 weight percent. On the other hand chlorine and bromine are highly undesirable in the solvent for pollution, corrosion and other reasons.

Polyvalent positively charged metal ion salts that are suitable for electrophotography and electrography are well known in the art and include, but are not limited to, soluble salts composed of metal ions and organic anions. Preferred positively charged metal ions are Ba(II), Ca(II), Mn(II), Zn(II), Zr(IV), Cu(II), Al(III), Cr(III), Fe(II and III), Sb(III), Bi(III), Co(II), La(III), Pb(II), Mg(II), Mo(III), Ni(II), Ag(I), Sr(II), Sn(IV), V(V), Y(III) and Ti(IV). The Preferred organic anions are carboxylates or sulfonates from aliphatic or aromatic carboxylic or sulfonic acids, preferably aliphatic fatty acids such as stearic acid, behenic acid, neodecanoic acid, diisopropylsalicylic acid, undecanoic acid, abietic acid, naphthenic acid, octanoic acid, lauric acid, tallic acid, etc. Barium Petronate TM (Witco Chemical Corporation, Sonneborn Division, N.Y.) is also a useful source of barium ion for practice of the present invention.

Images formed by the present invention may be single color or multicolor by repetition of the charging and toner application steps. Full color reproductions may be made according to the present invention by electrophotographic methods as described by U.S. Pat. Nos. 2,297,691, 2,752,833, 4,403,848, 4,467,334, 2,986,466; 3,690,756; and 4,370,047.

The substrate preferably should be conformable to the microscopic undulations of the surface roughness of the imaging surface. Materials such as polyvinyl chloride (PVC) conform to the imaging surface well whereas materials such as polycarbonate do not and consequently give bad transfer of the toner image. Other materials that may be used as substrates are acrylics, polyurethanes, polyethylene/acrylic acid copolymer and polyvinyl butyrals. Commercially available composite materials such as Scotchcal TM and Panaflex TM are also suitable substrates. However, some substrates such as polyesters and polycarbonates which appear to be too stiff to give microconformability can be useful as receptors in the present invention by coating them with a sufficiently thick layer of materials with a suitable $T_g$ and a complex dynamic viscosity in the range defined above. On substrates such as PVC the coated layer thickness can be as low as 3 micrometers whereas on Scotchlite TM retroreflective material, a coated layer thickness of 30 micrometers may be required.

Substrates may be chosen from a wide variety of materials including papers, plastics, etc. If a separate electroconductive layer is required, this may be of thin metal such as aluminum, or of tin oxide or other materials well known in the art to be stable at room temperatures and at the elevated temperatures of the transfer process.

Toners are usually prepared in a concentrated form to conserve storage space and transportation costs. In order to use the toners in the printer, this concentrate is diluted with further carrier liquid to give what is termed the working strength liquid toner.

In multicolor imaging, the toners may be laid down on the image sheet surface in any order, but for colorimetric reasons, bearing in mind the inversion that occurs on transfer, it is preferred to lay the images down in the order black, cyan, magenta, and yellow when multiple colors are to be overlaid.

Overcoating of the transferred image may optionally be carried out to protect against physical damage and/or actinic damage of the image. These coatings are compositions well known in the art and typically comprise a clear film-forming polymer dissolved or suspended in a volatile solvent. An ultraviolet light absorbing agent may optionally be added to the coating solution. Lamination of protective coats to the image surface is also well known in the art and may be used in this invention.

In order to function effectively, liquid toners should have conductance values in the range of 2 to 100 picomho-cm$^{-1}$. Liquid toners prepared according to the present invention have conductance values of 3–85 picomho-cm$^{-1}$ for a 2 weight percent solids dispersion. These and other aspects of the present invention are demonstrated in the illustrative examples that follow.

EXAMPLES

Materials used in the following examples were available from standard commercial sources such as Aldrich Chemical Co. (Milwaukee, Wis.) unless otherwise specified.

The term "perfluorooctyl acrylate" as used herein refers to $H_2C{=}CHCO_2CH_2(CF_2)_6CF_3$.

All the liquid toners described in the examples produced films of sufficient integrity to allow image formation and subsequent transfer steps.

Particle sizes were measured by a Coulter Model N4 MD submicron particle size analyzer.

Example 1

This example describes the synthesis of methacryloxy-terminated poly(perfluorooctyl)acrylate polymers (referred to as FC-stab-1) useful for stabilizing the polymer colloids in Fluorinert TM FC-84/FC-75. Perfluorooctyl acrylate monomer (90.82 g) was mixed with 47 g FC-85/FC-75 solvent in a 250 ml flask fitted with a nitrogen inlet, reflux condenser, and a thermometer. The heating was done by a heating mantle, connected to a thermostat circuit. 3-mercapto-1,2-propanediol (0.0864 g, $8\times10^{-4}$ moles), followed by 0.0656 g azobis isobutyronitrile were added and the mixture was heated to 70° C. for 24 hrs. Fluorinert TM FC-85/FC-75 (43.9 g) was added to obtain a theoretical solid content of ~50%. After cooling, under dry conditions, 0.248 g isocyanatoethyl methacrylate, followed by 0.1 g dibutyltin dilaurate catalyst were added and the mixture was kept stirred in the dark for 36 hours to produce FC-stab-1. The molecular weight of the macromer was found to be $\overline{Mm}=124{,}000$ by the NMR analysis. GPC analysis in Freon 113 using in-house calibration standards gave a $\overline{Mw}/\overline{Mm}=4$. Macromers of $\overline{Mw}>10{,}000$ did not yield stable dispersions.

Example 2

This example describes the synthesis of methacryloxy-terminated poly(undecafluorocyclohexylmethyl acrylate). Undecafluorocyclohexylmethyl acrylate (90 g) was dissolved in 47 g Fluorinert TM FC-85/FC-75 and polymerized in the presence of 0.0864 g 3-mercapto-1,2-propanediol at 70° C. in a nitrogen blanket using t-butyl peroctoate (Trigonox TM 21c-50). After 24 hrs of polymerization, the solution was diluted to a theoretical solid content of ~50%, by mixing with an additional 43.9 g Fluorinert TM FC-85/FC-75, cooled and treated with 0.248 g isocyanatoethyl methacrylate followed by 0.05 g dibutyltin dilaurate catalyst under dry conditions. After 36 hr of agitation of the mixture in the dark, the macromer was ready for use and is referred to below as FC-stab-2.

Example 3

This example describes a general procedure for preparation of hydrocarbon-fluorocarbon polymer resin dispersions in a perfluorinated solvent according to the first preferred embodiment. Sample FC-1 in Table 1 was prepared as follows:

A monomer mixture comprised of 10 g ethyl acrylate, 8 g ethyl methacrylate, 5 g butyl methacrylate and (2 g) acetoacetoxy ethyl methacrylate was suspended in a polymer solution consisting of 10 g of a 50% solution of methacryloxy-terminated poly(-perfluorooctyl acrylate) from Example 1 and 400 ml of Fluorinert TM FC-84. Zirconium Hex-Cem TM (12% $Zr^{4+}$ content; Mooney Chemical, Cleveland, Ohio), 1.5 ml, followed by 1 gram of 3M Fluorad TM FC-430 (a surfactant) were added and the mixture was stirred by magnetic stirring. The reaction mixture was contained in a 3-necked 1

L flask fitted with a watercooled reflux condenser, a nitrogen inlet tube, and a thermometer. After the emulsification of the monomers and the temperature remained constant at 70° C., 1 gram t-butyl peroctoate (Trigonox TM 21C-50) was added and the polymerization was allowed to proceed for 24 hrs. A white, stable latex was obtained with <2 grams of coagulum that was skimmed away. The solids content of the latex was 4.28 weight percent. For the latex a mean particle size of 440 nm was obtained with a narrow particle size distribution. This procedure may be used to generally prepare the polymer resins and dispersions, varying the regents within the classes previously described.

Example 4

An identical procedure as in the Example 3 was used to prepare additional sample, for example, sample FC-5 was prepared using the following monomer mixture: 8 g ethyl acrylate, 8 g ethyl methacrylate, 7 g butyl methacrylate and 2 g acetoacetoxyethyl methacrylate. The quantities of Zirconium Hex-cem TM, Fluorad TM FC-430 and Trigonox TM 21C-50 were the same as those in the Example 3. The solids content was 3.72 weight percent. For the latex mean a particle of 390 nm was obtained with a narrow particle size distribution.

Similarly, samples FC-4, FC-15, FC-17 through FC-20, and FC-25 were prepared by the same method with adjustments in hydrocarbon monomer composition as shown in Table 1.

Example 5

This example describes a general procedure for the dispersion of polymer resin bound pigment particle dispersions Fluorinert TM FC-84/FC-75 (i.e., liquid toners). The fluorinated latices of Examples 3 and 4 and those of Table 1 were mixed with pigment and dispersed as follows:

The latex (600 g) from each experiment was taken and a calculated quantity of the cyan pigment (Sunfast Blue 249-1282, Sun Chemical Co.) was added such that the weight ratio of the resin to pigment was 4:1. The latex/pigment mixture was placed in an Igarashi Mill and the pigment was dispersed at 2000 rpm stirring, with an adequate quantity (about 400-450 g) of 1.3 mm Potter Glass beads as shearing media. The dispersion of pigment was carried out for 15 minutes, with the Igarashi cylinder cooled in an ice bath to prevent the evaporation of the solvent. After draining and collecting the toner, the glass beads were washed with about 100 g of the solvent and the washings were mixed with the toner. The solids content of the toner fluid was determined. Table 1 summarizes the experimental conditions employed to prepare toners numbered FC-1 etc.

TABLE 1

Synthesis of Dispersants and Toners in Fluorinert TM FC-84 or FC-75

| Resin | Stabilizer | Core Monomers; $Zr^{+4}$; Surfactant; | Resin to Pigment Ratio | Comment |
|---|---|---|---|---|
| FC-1 | FC-Stab-1 5 g solids | EA:EMA:BMA:AAMA (10:8:5:2); 1.5 g; FC-430; 1 g | 4 | Stable Dispersion |
| FC-5 | FC-Stab-1 5 g solids | EA:EMA:BMA:AAMA (8:8:7:2); 1.5 g; FC-430; 1 g | 4 | Stable Dispersion |
| FC-4 | FC-Stab-2 5 g solids | EA:EMA:TFA:AAMA (10:8:5:2); 1.5 g; FC-430; 1 g | none | Unstable Dispersion |
| FC-15 | FC-Stab-1 5 g solids | EA:EMA:BMA:AAMA (8:8:7:2); 1.5 g; FC-430; 1 g† | 4 | Stable Dispersion |
| FC-17 | FC-Stab-1 5 g solids | EA:VAc:AAMA (15:8:2); 1.5 g; FC-430; 1 g† | 4 | Stable Dispersion |
| FC-18 | FC-Stab-1 5 g solids | EA:EMA:BMA:AAMA (10:6:7:2); 1.5 g; FC-430; 1 g† | 4 | Stable Dispersion |
| FC-19 | FC-Stab-1 5 g solids | EA:3,4MEST:AAMA (15:8:2); 1.5. g; FC-430; 1 g† | 4 | Stable Dispersion |
| FC-20 | FC-Stab-1 5 g solids | EA:IBA:AAMA (15:8:2); 1.5 g; FC-430; 1 g† | 4 | Stable Dispersion |
| FC-25 | FC-Stab-1 5 g solids | EA:EMA:BMA:TMPS: AAMA (8:5:7:3:2); 1.5 g† | 4 | Stable Dispersion |

EA = ethyl acrylate; EMA = ethyl methacrylate; BMA = butyl methacrylate; TFA = 2,2,2-trifluoroethyl acrylate; AAMA = acetoacetoxyethyl methacrylate; VAc = vinyl acetate; 3,4MEST = a mixture of 3- and 4-methylstyrene available from Aldrich Chemical Co. (1992-1993 Cat. No. 30,898-6). Fluorinert TM FC-84 or FC-75 (400 ml) was used for polymerization at 70° C. with 1 g of t-butyl peroctoate as the initiator.

† Fluorinert TM FC-75 (400 ml) was used for polymerization at 70° C. with 1 g of t-butyl peroctoate as the initiator.

The toners of the present invention were electroplated on the cathode of a photoconductor strip with the coating drying in less than 5 seconds.

Example 6

This example demonstrates hydrocarbon predominantly fluorocarbon polymer resin dispersions in a perfluorinated solvent according to the second preferred embodiment. For example FC-16 was prepared as follows:

A mixture of 15 g undecafluorocyclohexylmethyl acrylate, 8 g 2,2,2-trifluoroethyl acrylate and 10 g of a 50% solution of methacryloxy-terminated poly(undecafluorocyclohexylmethyl acrylate) in Fluorinert TM FC-84 was diluted with 400 mL Fluorinert TM FC-75. Acetoacetoxyethyl methacrylate (2 g) and Zirconium Hex-cem TM (1.5 g; 12% $Zr^{4+}$ content; Mooney Chemical, Cleveland, Ohio) were introduced into the mixture and the mixture was maintained at 70° C. in a nitrogen atmosphere, with the reaction flask fitted with a reflux condenser. The hydrocarbon monomer at first remained insoluble. A polymerization initiator, t-butyl peroctoate (1 g), was added and the reaction mixture was kept stirred by a magnetic stir bar throught the reaction time of >24 hrs. A translucent emulsion, visually resembling a micro-emulsion was obtained. The solids content of the latex was 3.26 weight percent. A mean particle diameter of 365 nm was obtained.

Example 7

This experiment was run identically to Example 6 with the following change in the monomer mixture to prepare FC-3: the new monomer mixture consisted of 15 g undecafluorocyclohexylmethyl acrylate, 8 g 2,2,2-trifluoroethyl acrylate and 2 g acetoacetoxyethyl methacrylate. Again, a translucent emulsion was obtained. The solids content of the latex was 4.06 weight percent.

Example 8

This experiment was run identically to Example 6 with the following change in the monomer mixture to prepare FC-11: 11 g perfluorooctyl acrylate, 11 g undecafluorocyclohexylmethyl acrylate, and 3 g acetoacetoxyethyl methacrylate. The stabilizer used was FC-Stab-1 from Example 1. A stable emulsion was obtained. The solids content of the latex was 3.9 weight percent.

Samples FC-2, FC-21, FC-22, and FC-25 were similarly prepared by varying monomers amounts as listed in Table 2.

Example 9

This example describes a general procedure for the dispersion of pigments in Fluorinert™ FC-84.

The latex (600 g) from Examples 6–8 was taken and calculated quantity of the cyan pigment (Sunfast Blue 249-1282) was added such that the weight ratio of the resin to pigment equaled to 4. The dispersion of the pigment was carried out in an Igarashi Mill at a stirring speed of 2000 rpm with adequate quantity (about 400–450 g) of 1.3 mm Potter Glass beads as shearing media. The grinding was done under the cooling of the ice bath to prevent evaporation of the solvent. After draining and collecting the toner, the glass beads were washed with about 100 g of the solvent and the washings were mixed with the toner. The solid content of the toner was determined.

TABLE 2

Synthesis of Dispersants and Toners in Fluorinert FC 84 ™ or FC-75

| Resin | Stabilizer | Core Monomers; $Zr^{+4}$; Surfactant | Resin | Comment |
|---|---|---|---|---|
| FC-2 | FC-Stab-2 5 g solids | PcHA:FOA:AAMA (15:8:2); 1.5 g; none; 1 g, | 4 | Stable Dispersion |
| FC-3 | FC-Stab-2 5 g solids | PcHA:TFA:AAMA (15:8:2); 1.5 g; none; 1 g | 4 | Stable Dispersion |
| FC-11 | FC-Stab-1 5 g solids | FOA:PcHA:AAMA (11:11:3); 1.5 g; 1 g | 4 | Stable Dispersion |
| FC-16 | FC-Stab-1 5 g solids | PcHA:TFA:AAMA (15:8:2); 1.5 g† | 4 | Stable Dispersion |
| FC-21 | FC-Stab-1 5 g solids | FOA:PcHA:AAMA (17:5:3); 1.5 g† | 4 | Stable Dispersion |
| FC-22 | FC-Stab-1 5 g solids | PcHA:FOA:TFA: TMPS:AAMA (10:5:5:3:2); 1.5 g† | 4 | Stable Dispersion |

*PcHA = Undecafluorocyclohexylmethyl acrylate; FOA: Perfluorooctyl acrylate; TFA = 2,2,2-trifluoroethyl acrylate; AAMA = acetoacetoxyethyl methacrylate; EMA = ethyl methacrylate; TMPS = tris(trimethylsiloxy)-3- methacrylaoxypropylsilane; BMA = butyl methacrylate. Fluorinert ™ FC-84 (400 ml) was used for polymerization at 70° C. with t-butyl peroctoate (1 g) as the initiator.
† Fluorinert ™ FC-75 (400 ml) was used for polymerization at 70° C. with t-butyl peroctoate (1 g) as the initiator.

Example 10

This example demonstrates the synthesis of polymer resin bound pigment particles of the third preferred embodiment by solution polymerization of perfluorinated monomer mixtures to obtain polymer solutions, which can be directly used as dispersion media for pigments. Sample FC-13 was prepared by mixing 15 g perfluorooctyl acrylate and 15 g perfluorooctyl methacrylate with 100 mL Fluorinert™ FC-75 and polymerized at 70° C. in a nitrogen atmosphere under reflux. t-Butyl peroctoate (Trigonox 21c-50, 1 g) was used as an initiator. After 24 hrs, the viscous polymer solution was diluted to 4% solids with FC-75 and used directly for dispersing cyan pigment.

Example 11

Sample FC-14 was prepared according to the procedure of Example 10, but with the following monomer mixture: 10 g perfluorooctyl acrylate, 10 g perfluorooctyl methacrylate, and 10 g undecafluorocyclohexyl methyl acrylate. Samples FC-23 and FC-24 were similarly prepared using the monomers listed in Table 3.

Example 12

This example describes a general procedure for the dispersion of pigments in perfluorinated solvents. Cyan pigment (6 g) was suspended in the polymer solution (600 g) and dispersed for 15 min. in an Igarashi Mill at 2000 rpm using Potter 1.3 mm beads as shearing media. During dispersion, Zirconium Hex-cem™ (1.5 g, 12% $Zr^{4+}$ content, Mooney Chemical) was added in drops over an interval of 5 minutes. After draining, the glass beads were washed with a suitable quantity of the solvent and the washings were mixed with the rest of the toner. The solid content of the toner was determined.

TABLE 3

Synthesis of soluble polymeric dispersants in Fluorinert FC-75

| Resin | Monomer Mixture* | Resin |
|---|---|---|
| FC-13 | FOA:FOMA = 15:15 | 4 |
| FC-14 | FOA:FOMA: PCHA = 10:10:10 | 4 |
| FC-23 | FOA:FOMA = 20:5 | 4 |
| FC-24 | FOA:PcHA = 20:5 | 4 |

*100 g of FC-75 was used as the solvent. t-Butyl peroctoate (1 g) was used as an initiator.
FOA = perfluorooctyl acrylate;
FOMA = perfluorooctyl methacrylate;
PcHA = undecafluorocyclohexyl methyl acrylate Example 13

As a test example of a toner with hydrocarbon core and fluorocarbon shell, the toner. FC-5, described in Example 4, was imaged on a positive corona charged photoconductor (600–800 V) coated with a silicone release layer, after exposure to a laser beam from an image scanner to generate an image pattern. The image was developed at the surface rate of about 10 cm/sec. and was completely dry in 3 seconds at the room temperature. The image was first transferred at room temperature under pressure to a fluorosilicone elastomer (Dow Corning 94003) and then from the elastomer surface to a plain paper surface at a speed of about 7.6/sec under heat and pressure. The temperature of the roller base under the paper was 168° C., although the paper temperature was generally considerably less.

Example 14

In another example of the invention wherein a predominantly fluorocarbon binder is used in the toner, the toner FC-16 described in Example 6 was tested under a similar procedure as was FC-5, and required >117° C. for the transfer form the photoconductor to the fluorosilicone intermediate surface, and for the transfer from the latter surface to the paper.

Example 15

In another example of the toner, here using soluble polymers, comprising the toner from fluorocarbon soluble polymers without any hydrocarbon component, namely, toners with resins comprising 100% perfluorinated (meth)acrylates (the toner FC-23) were tested under similar conditions as described for FC-5, showed excellent transfer from the photoconductor to the fluorosilicone intermediate surface at the room temperature. The transfer from the fluorosilicone surface to the paper occurred at >119° C.

What is claimed is:

1. Polymer resin bound pigment particles, comprising pigment particles in intimate association with a polymeric resin, wherein the polymeric resin is a copolymer of a) 65 to 89.5 weight percent of a non-fluorinated free-radically polymerizable monomer, b) 10 to 20 weight percent perfluorinated macromer terminated at exactly one end with a free-radically polymerizable group, and c) from 0.5 to 15 weight percent of a free-radically polymerizable monomer which is not a perfluorinated monomer having a group binding a polyvalent metal ion.

2. The resin bound pigment particles of claim 1 wherein monomer a) comprises an acryloyl or methacryloyl monomer.

3. The resin bound pigment particles of claim 1 wherein macromer b) has a number average molecular weight between 10,000 and 250,000 grams/mole and a fluorine content of from 40 to 95% by weight.

4. The resin bound pigment particles of claim 3 wherein said macromer b) comprises a polymer formed from monomers selected from the group consisting of perfluorinated epoxides, fluorinated alkenes, fluorinated acrylates, perfluorinated vinyl ethers, and fluorinated alkyl acrylonitrile.

5. The resin bound pigment particles of claim 2 wherein macromer b) has a number average molecular weight between 10,000 and 250,000 grams/mole and a fluorine content of from 40 to 75% by weight.

6. A latex comprising a dispersion in a carrier liquid of the particles of claim 1.

7. The latex of claim 6 wherein said carrier liquid comprises a fluorinated hydrocarbon having greater than 60% by weight of fluorine.

8. Polymer resin bound pigment particles, comprising pigment particles in intimate association with a polymeric resin, wherein the polymeric resin is a copolymer of from 75 to 98 weight percent of a perfluorinated free-radically polymerizable monomer, and from 2 to 25 weight percent of a free-radically polymerizable non-fluorinated monomers, wherein at least 0.5 to 15 weight percent on a weight basis of said copolymer of the free-radically polymerizable monomers has a group for binding a polyvalent metal ion.

9. A latex comprising a dispersion in a carrier liquid of the particles of claim 8.

10. The latex of claim 9 wherein said carrier liquid comprises a fluorinated hydrocarbon of at least 60% by weight fluorine.

11. Polymer resin bound pigment particles, comprising pigment particles in intimate association with a polymeric resin, wherein the polymeric resin is a copolymer of a) 65 to 89.5 weight percent of a non-fluorinated free-radically polymerizable monomer, b) 10 to 20 weight percent of a fluorinated macromer terminated at exactly one end with a free-radically polymerizable group, and c) from 0.5 to 15 weight percent of a free-radically polymerizable monomer which is not a fluorinated macromer as in b) having a group binding a polyvalent metal ion.

12. Polymer resin bound pigment particles, comprising pigment particles in intimate association with a polymeric resin, wherein the polymeric resin is a copolymer of from 75 to 98 weight percent of a fluorinated free-radically polymerizable monomer, and from 2 to 25 weight percent of a free-radically polymerizable non-fluorinated monomers, wherein at least 0.5 weight percent of the free-radically polymerizable non-fluorinated monomers has a group for binding a polyvalent metal ion.

13. Polymer resin bound pigment particles, comprising pigment particles in intimate association with a polymeric resin, wherein the polymeric resin is a copolymer of a) 65 to 89.5 weight percent of a non-fluorinated free-radically polymerizable monomer, b) 10 to 20 weight percent of a fluorinated macromer having a fluorine content of from 40 to 95% by weight terminated at exactly one end with a free-radically polymerizable group, and c) from 0.5 to 15 weight percent of a free radically polymerizable monomer which is not a fluorinated macromer as in b) having a group binding a polyvalent metal ion.

14. Polymer resin bound pigment particles, comprising pigment particles in intimate association with a polymeric resin, wherein the polymeric resin is a copolymer of from 75 to 98 weight percent of a fluorinated free-radically polymerizable monomer having a fluorine content of from 40 to 95% by weight, and from 2 to 25 weight percent of a free-radically polymerizable non-fluorinated monomers, wherein at least 0.5 weight percent of the free-radically polymerizable non fluorinated monomers has a group for binding a polyvalent metal ion.

* * * * *

UNITED STATES PATENT AND TRADEMARK OFFICE

CERTIFICATE OF CORRECTION

PATENT NO. : 5,397,669

DATED : March 14, 1995

INVENTOR(S) : Rao

It is certified that error appears in the above-indentified patent and that said Letters Patent is hereby corrected as shown below:

Column 4, line 54, delete "$CH_{20}$" and insert --$CH_2$--.

Column 12 line 35, delete "PCHA" and insert --PcHA--.

Signed and Sealed this

Tenth Day of October, 1995

Attest:

Bruce Lehman

BRUCE LEHMAN

Attesting Officer

*Commissioner of Patents and Trademarks*